United States Patent [19]
Garcia

[11] 3,734,644
[45] May 22, 1973

[54] HELICOPTER ROTOR PITCH CONTROL SYSTEM

[75] Inventor: Jean-Claude Garcia, Pelissanne Bouches-du-Rhone, France

[73] Assignee: Societe Nationale Industrielle Aerospatiale, Paris, France

[22] Filed: Dec. 13, 1971

[21] Appl. No.: 207,043

[30] Foreign Application Priority Data

Dec. 14, 1970  France..................................7044937

[52] U.S. Cl.................................................416/114
[51] Int. Cl..............................................B64c 27/72
[58] Field of Search..............................416/112–115

[56] References Cited

UNITED STATES PATENTS

| | | | |
|---|---|---|---|
| 2,753,004 | 7/1956 | Jovanovich | 416/115 |
| 2,861,640 | 11/1958 | Du Pont | 416/114 UX |
| 2,978,038 | 4/1961 | Doman et al. | 416/114 |
| 3,134,444 | 5/1964 | Egerton et al. | 416/114 X |

FOREIGN PATENTS OR APPLICATIONS 632,606  11/1949  Great Britain....................416/114

Primary Examiner—Everette A. Powell, Jr.
Attorney—Karl W. Flocks

[57] ABSTRACT

A blade pitch control assembly in accordance with the invention comprises an inner disc rotating with the rotor shaft and an outer non-rotating connected connected to the first disc by a bearing and which can be tilted by pitch variation control means.

4 Claims, 4 Drawing Figures

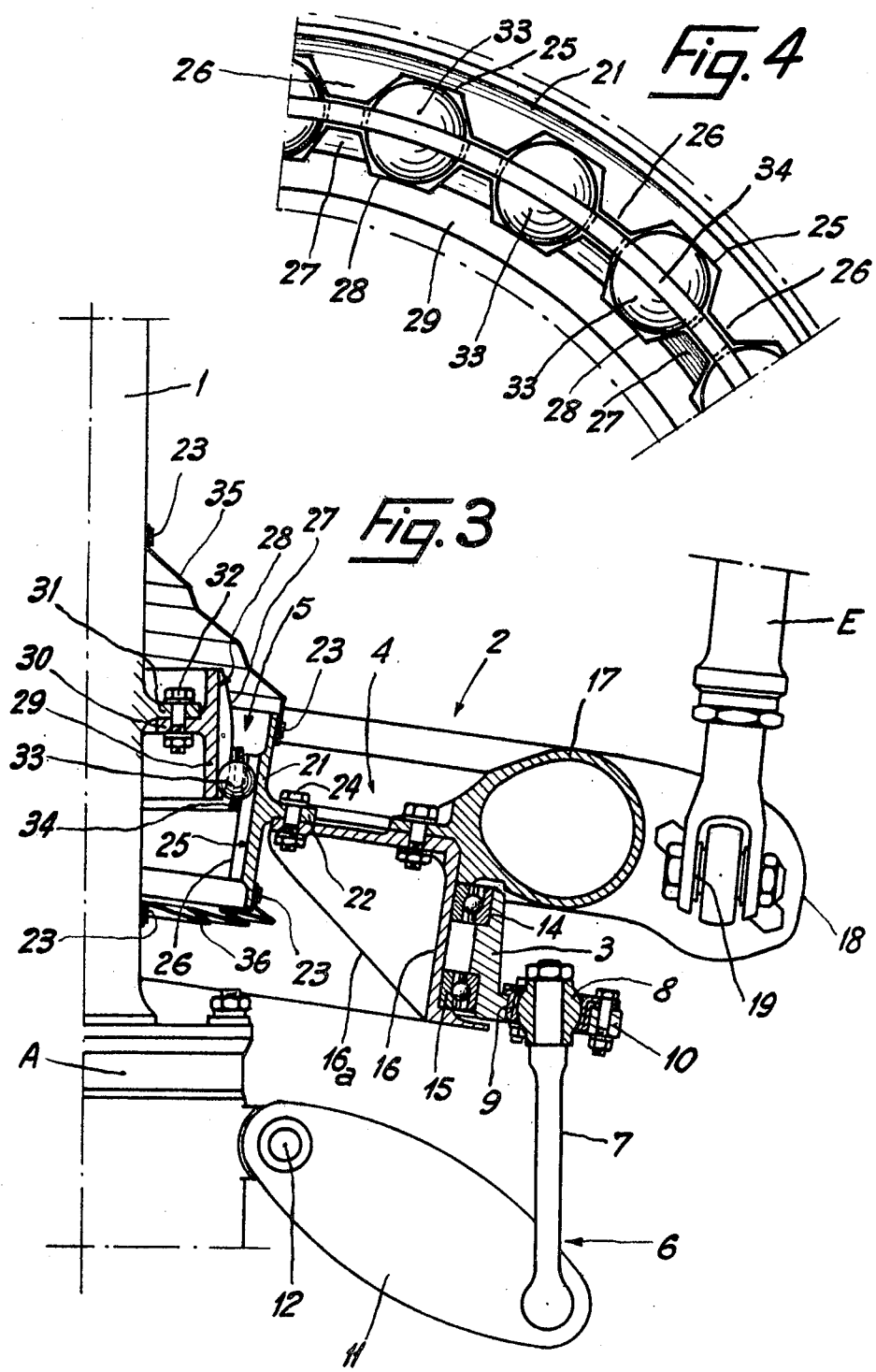

HELICOPTER ROTOR PITCH CONTROL SYSTEM

This invention relates to a pitch control system for helicopter blades, more particularly to a system serving as a means for general pitch control and cyclic pitch control of the blades.

To pilot a helicopter by way of its lift rotor or rotors, either the inclination of the rotor shaft must be varied relatively to the helicopter or, if the rotor shaft is non-movably mounted in the helicopter, blade pitch must be cyclically altered. In either case the lift force can be varied by varying the pitch of all the blades simultaneously in the same sense (collective or general pitch).

The invention relates to helicopters having a non-movably mounted rotor shaft.

In known constructions of this kind an assembly comprising two concentric annular discs is mounted by way of rolling friction bearings and of an axially sliding swivel joint on the shaft of the lift rotor. Through the agency of strutting one of the two discs is connected to the rotating rotor shaft and the other of the two discs is connected to the non-moving rotor support pylon; the non-rotating disc is acted upon by the pilot-initiated general pitch and cyclic pitch controls or drives, whereas a rod connects each individual blade associated with the other disc to the pitch control lever for such blade. For general pitch control, therefore, the two discs are moved together axially by axial sliding of the swivel joint, whereas for cyclic pitch variations the discs are tilted.

The swivel joint can be disposed on a non-moving sleeve extending coaxially around the rotor shaft, in which event the inner disc is the non-moving disc and the rotating disc is the outer disc. Alternatively, the swivel joint can be directly mounted on the rotor shaft, in which event the rotating pitch control disc is the inner disc whereas the outer disc is non-rotating and is acted on by the controls.

These constructions are in any case very complex. The number of parts required for them may exceed 100. Also, there is severe stressing of some of the elements such as the struts, whether they inhibit rotation of the stationary disc or whether they enable the rotating disc to rotate. There is also considerable wear-causing friction in the sliding mechanism of the swivel joint and between the latter and the disc which it bears, with a consequent considerable risk of clearances which in turn lead to vibration or jamming of the control and the need for frequent inspection.

This invention obviates these disadvantages.

According to the invention, the inner disc is mounted on the rotor shaft with the interposition of a joint comprising an inner ring rigidly secured to the rotor shaft and an outer ring rigidly secured to the inner disc, such rings being separate from one another and being formed in regularly distributed manner with a number of facing axial grooves, each pair of facing grooves cooperating to retain a ball, all the balls being retained in a cage disposed in the gap between the rings.

A connection or joint of this kind is already known as a homokinetic joint enabling a drive to be transmitted between two shafts whose axes are concurrent but which may have a variable angular position and some freedom for displacement.

This joint serves a different purpose in this invention. The power-transmitting rotor shaft is straight and extends through the joint, whose main function is to enable the rotating inner disc to have limited provision for sliding along the rotor shaft and for tilting in all directions relatively to the rotor shaft axis. As a subsidiary feature, the joint enables the inner disc to rotate without any auxiliary means, since a joint of this kind enables the two rings forming the joint to move axially and to tilt relatively to one another, yet in all positions the two rings continue to rotate solidly with one another by way of the balls, which experience a shear stress.

Preferably, if the base of the grooves in the inner ring extends parallel to the axis, the ribs separating two adjacent grooves from one another have a toroidal outside surface, and the cage is a narrow ring of spherical shape. This feature is a means of increasing the angle by which the rings can tilt relatively to one another. Advantageously, the inner disc has a downwardly extending edge which serves to bear the rolling-friction bearings of the outer ring, which in this case its shape is a substantially cylindrical ring.

Preferably, the inner disc is stiffened by a tubular toroidal ring which can bear the articulations for the pitch control rods or linkage.

In a mechanism of this kind the resistive rotational torque and the oscillating movements are transmitted by way of the joint balls which run in their retaining recesses. There is virtually zero wear of the balls, for in contrast to the conventional device which uses a swivel there is no friction in the mechanism according to the invention. Similarly, since only a reduced torque is needed to rotate just the rotating disc, only slight shear stress is applied to each ball, and so the mechanism according to the invention has a considerably longer working life than do the drive struts of the conventional system, where fatigue strain is very high.

For a better understanding of the invention, reference may now be made to the accompanying drawings wherein:

FIG. 3 is an axial half-section of the system in one of its end positions, and

FIG. 4 is a partial section on the line IV—IV of FIG. 2 of the connection between the inner disc and the rotor shaft.

Figure 1:
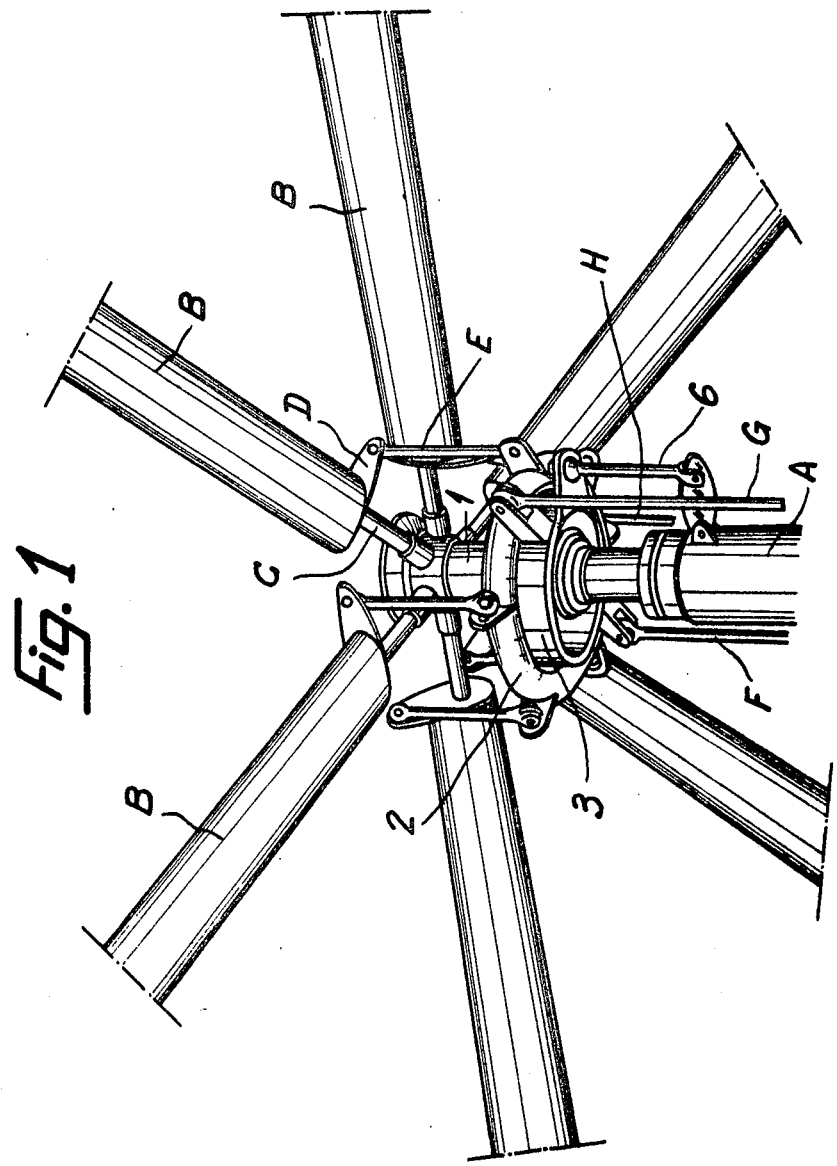
FIG. 1 is a perspective view of a rotor having a pitch control system according to the invention.

Referring to FIG. 1, a pylon A of a helicopter (no other parts of which are shown) bears a rotor shaft 1; blades B are, through the agency of bending and twisting connecting elements C, provided at the top of shaft 1. The pitch of each blade can be altered by cyclic pitch control discs 2 through the agency of pitch levers D and connecting linkage E. The cyclic disc system 2 comprises an outer disc 3, which a strut 6 prevents from turning, and an inner disc 4 which rotates with the rotor shaft and which is strengthened by a tubular toroidal ring 17 to which the rods E are pivotally connected. The disc system 2 can be tilted by the differential action on it of the three cyclic pitch controls F,G,H, and general pitch control is provided by an overall movement of the disc system 2 resulting from shifting the three facilities, F,G,H simultaneously in the same direction.

The following drawings give details of the construction of the system 2.

Outer disc 3, in the form of a cylindrical ring, is disposed at the periphery of inner disc 4 which is so connected to shaft 1 by connection 5 as to be free to move relatively to shaft 1. Strut 6 has a vertical arm 7 terminating at the top in a swivel ball 8 rotatable in a socket 9 in a leg rigidly secured to disc 3; at its bottom end arm 7 is pivoted to bottom arm 11 which is pivoted on a pivot 12 rigidly secured to pylon A.

The ends of the servocontrols F,G,H are pivotally connected by way of swivel joints in yokes 13 rigidly secured to disc 3.

Outer plate 3 is connected to inner plate 4 by way of two rolling bearings 14, 15 mounted on a downwardly extending edge 16 of disc 4, with stiffening by radial gussets 16a. Secured to the edge of inner plate 4 is a tubular torus 17 having on its periphery lugs 18 receiving shafts 19 bearing the pitch variation control levers.

Outer member 21 of sliding connection 5 is secured to the inside edge of disc 4 by means of a collar 22 which is rigidly secured to member 21 and which is clamped against the inner edge of disc 4 by means of a nut and bolt connection 24. The inside surface of member 21 is formed with axial grooves 25 separated from one another by ribs 26 opposite which are grooves 28 separated by ribs 27 machined in the outside surface of inner articulation member 29, the same having a collar 30 which a nut and bolt connection 32 clamps against a collar 31 rigidly secured to shaft 1. The grooves 26, 27 receive balls 33 retained in a cage 34 in the form of a spherical ring pierced with ball-retaining apertures.

Joint 5 is sealed for protection against foreign bodies and against loss of lubricant by means of a flexible top boot or cover or the like 35 and a similar flexible bottom boot or the like 36, integer 35 being connected to shaft 1, and integer 36 being connected to member 21, by respective clamping collars 23. Joint 5 is therefore lubricated for life and needs no servicing.

To facilitate tilting and increase the amplitude thereof, the ribs 27 have, as shown, a toroidal counter. Also, the grooves 25, 28 are of a known shape to retain the balls 33 without excessive clearance and to provide lateral support for them.

To vary the cyclic pitch of the lift rotor, the pilot operates servo-controls F,G,H to pivot system 2 through the agency of integers 21, 33 and 34; the pivoting movement is limited by the shape of the cage and by abutments (not shown) which the controls F,G,H have upstream of the system 2. To vary the general rotor blade pitch the pilot operates the servocontrols to shift the system 2 axially through the agency of the member 21, the same moving on the balls 33, relatively over the member 29, to a distance corresponding to the required pitch.

Figure 2:
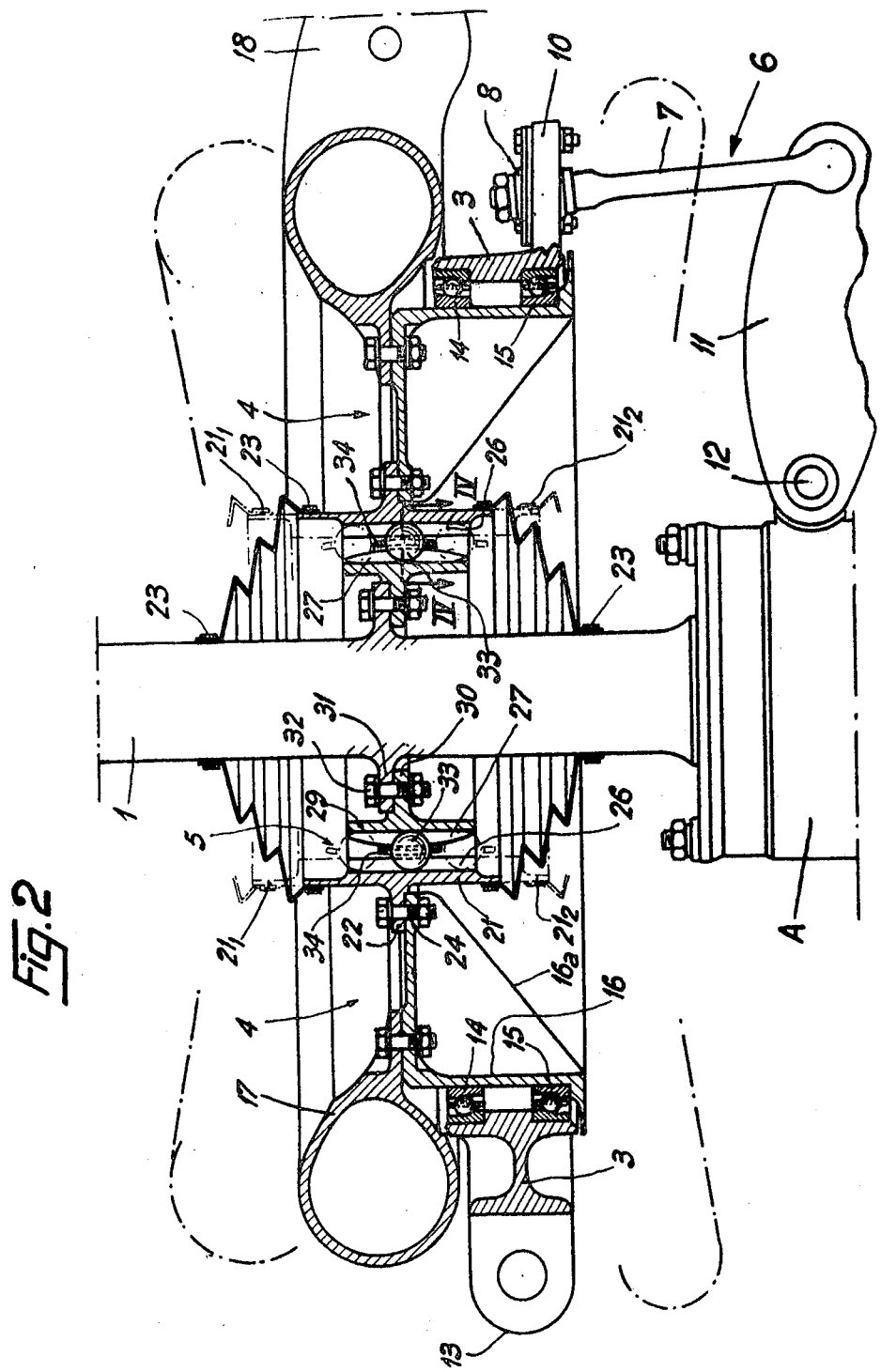
FIG. 2 is an axial section through the control system shown in FIG. 1.

FIG. 2 shows the bottom and top limit positions $21_1$, $21_2$ of the ring 21, and FIG. 3 shows the extreme position into which ring 21 can be tilted from its bottom position.

The invention is of use for all single and multiple helicopter rotors having fixed-position rotor shafts and cyclic control of rotor blade pitch.

I claim:

1. In a blade pitch control assembly comprising an inner annular disc controlling the pitch of blades corotating with a rotor shaft, such disc being adapted to move axially and to be pivoted relatively to the rotor shaft, the system also comprising a non-rotating outer disc which is connected to the first disc by a rolling-friction bearing and which can be tilted by the cyclic and general pitch variation control means, the improvement that the inner disc is mounted on the rotor shaft with the interposition of a joint comprising an inner ring rigidly secured to the rotor shaft and an outer ring rigidly secured to the inner disc, such rings being separate from one another and being formed in regularly distributed manner with a number of facing axial grooves, each pair of facing grooves cooperating to retain a ball, all the balls being retained in a cage disposed in the gap between the rings.

2. The improved assembly of claim 1, wherein the outer ring is basically a cylindrical ring mounted with the interposition of rolling friction bearings on a downwardly extending cylindrical edge of the inner disc.

3. The improved assembly of claim 1 wherein the inner disc is strengthened by a projecting tubular torus which bears the pivots of the pitch control linkage.

4. The improved assembly of claim 1 wherein the top and bottom edges of the outer ring are connected to the rotor shaft by hermetic deformable boots or the like which are in general shape trunco-conical and which retain the joint lubrication permanently.

* * * * *